US012629786B2

(12) United States Patent
Bergin et al.

(10) Patent No.: US 12,629,786 B2
(45) Date of Patent: May 19, 2026

(54) METHOD FOR MANUFACTURING A HEAT EXCHANGER BY BRAZING A TEMPERATURE PROBE, CORRESPONDING HEAT EXCHANGER AND TEMPERATURE PROBE

(71) Applicant: ALFA LAVAL GOLBEY SAS, Golbey (FR)

(72) Inventors: Gaëtan Bergin, Golbey (FR); Thierry Mazet, Golbey (FR)

(73) Assignee: ALFA LAVAL GOLBEY SAS (FR)

( * ) Notice: Subject to any disclaimer, the term of this patent is extended or adjusted under 35 U.S.C. 154(b) by 0 days.

(21) Appl. No.: 18/849,513

(22) PCT Filed: Mar. 15, 2023

(86) PCT No.: PCT/EP2023/056650
§ 371 (c)(1),
(2) Date: Sep. 22, 2024

(87) PCT Pub. No.: WO2023/180146
PCT Pub. Date: Sep. 28, 2023

(65) Prior Publication Data
US 2025/0205835 A1    Jun. 26, 2025

(30) Foreign Application Priority Data

Mar. 24, 2022    (FR) ...................................... 2202611

(51) Int. Cl.
*B23P 15/26*        (2006.01)
*F28F 27/00*        (2006.01)

(52) U.S. Cl.
CPC .............. *B23P 15/26* (2013.01); *F28F 27/00* (2013.01)

(58) Field of Classification Search
CPC . B23P 15/26; F28F 27/00; F28F 3/025; F28F 21/084; F28F 2275/045;
(Continued)

(56) References Cited

U.S. PATENT DOCUMENTS 5,161,297 A * 11/1992 Ruhl ...................... H10N 10/01
427/304
7,080,941 B1    7/2006 Benjamin et al.
(Continued)

FOREIGN PATENT DOCUMENTS

FR            3110098 A1    11/2021
KR    20120039093 A    4/2012

OTHER PUBLICATIONS

International Search Report of PCT/EP2023/056650, Issued Sep. 23, 2023.

*Primary Examiner* — Lee A Holly
(74) *Attorney, Agent, or Firm* — The Belles Group, P.C.

(57) ABSTRACT

Disclosed is a method for manufacturing a heat exchanger, comprising a step of assembling, by brazing, a temperature probe to an element of the exchanger, the temperature probe comprising a sheath. The method further comprises a step, prior to the assembly step, in which a thin coating is deposited on the sheath in order to prevent dissolution thereof by an alloy used as filler metal for the brazing. The subject matter also relates to the heat exchanger which can be obtained by the method, and also to the temperature probe prepared in order to carry out the above method.

10 Claims, 2 Drawing Sheets

(58) Field of Classification Search
CPC ............ B23K 2101/14; B23K 2103/04; B23K
2103/10; B23K 1/0012; B23K 1/008;
B23K 1/19; F28D 9/0068; F28D 9/0062;
G01K 1/143
See application file for complete search history.

(56)                     References Cited

U.S. PATENT DOCUMENTS

2011/0013669 A1*    1/2011   Raj   ......................... G01K 1/08
                                                           374/E7.004
2018/0143083 A1*    5/2018   Pastore   .................... G01K 1/08
2021/0354224 A1*   11/2021   Seiwert   ................. F28D 9/0062

* cited by examiner

[Fig. 1]
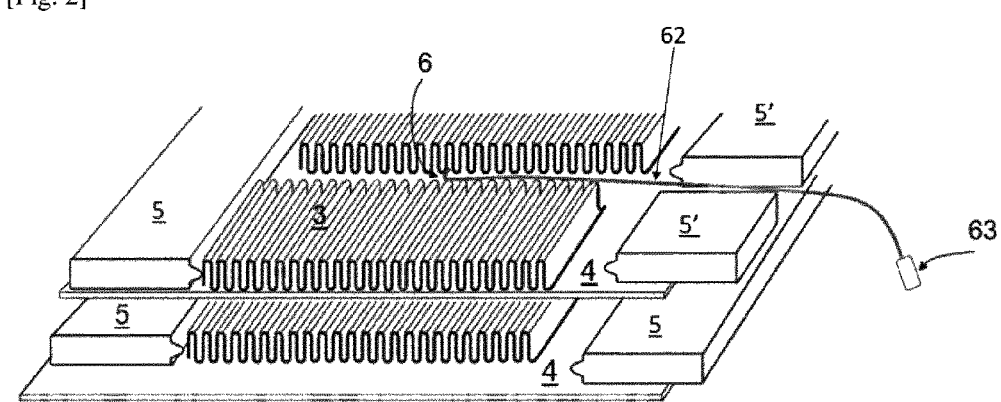
[Fig. 2]

[Fig. 3]
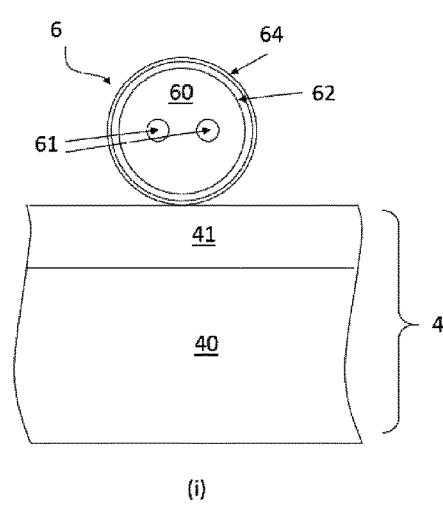
(i)
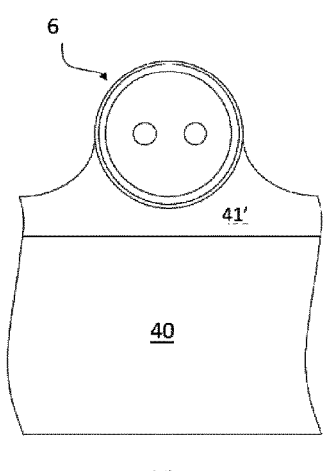
(ii)

METHOD FOR MANUFACTURING A HEAT EXCHANGER BY BRAZING A TEMPERATURE PROBE, CORRESPONDING HEAT EXCHANGER AND TEMPERATURE PROBE

CROSS-REFERENCE TO RELATED APPLICATIONS

This U.S. Non-Provisional Patent Application is a U.S. National Stage Application under 35 U.S.C. § 371 of Patent Cooperation Treaty (PCT) Application No. PCT/EP2023/056650, filed Mar. 15, 2023, which claims priority to French Patent Application No. FR2202611, filed on Mar. 24, 2022, the entire disclosures of all of which are hereby incorporated by reference herein, for all purposes.

TECHNICAL FIELD OF THE INVENTION

The invention belongs to the technical field of instrumentation for aluminum equipment, such as heat exchangers for air separation and/or hydrocarbon distillation, assembled in a brazing operation.

More particularly, the invention concerns an assembly method for permanently assembling a temperature probe to the core of a heat exchanger structure, for example one made of aluminum.

STATE OF THE ART

The state of the art includes publications on the need to instrument equipment of the type mentioned above, so as to be able to deduce their state of damage when subjected to thermal loading. However, few publications deal with how to instrument them, especially when it comes to obtaining thermal data representative of the temperature of the sheets separating the fluids.

The use of an optical fiber to be integrated inside the structure of the equipment is mentioned in the literature, but its use requires modifying the structure of the device by adding a non-active layer, wherein the fiber is placed. The measured temperatures, which are then used to estimate device lifetime, are unreliable, as they are only an approximation of the actual temperature at which the measured device structure is located.

Also known is FR3110099A1, whose proposed solution consists in cutting grooves in a metal sheet, in which the temperature probes (thermocouples) are subsequently placed. The brazed or unbrazed sheet is then covered by a second sheet. The assembly is then used in the structure as a single sheet separating the fluids.

Shims are also inserted into the grooves beforehand, and removed after brazing to allow temperature probes to be inserted.

In a variant described in FR3110098A1, the temperature probes are inserted into the grooves before brazing, and the structure is brazed with the temperature probes already positioned in the grooves. The melting of the brazing filler, following the manufacture of the equipment, joins the two sheets, permanently assembling the temperature probes to the structure and filling the grooves wherein the probes have been inserted.

While both solutions enable the temperature of the separator plates to be measured, they are expensive and difficult to implement, given the size of the plates in which the grooves have to be made. They inevitably lead to a significant thickening of the separator plate where the temperature probes are installed.

The production of grooves on thin flat products (on the order of a mm) with large dimensions (on the order of a meter) poses serious machining problems. In fact, very few machining units can perform this type of operation. Other difficulties remain concerning the attachment of temperature probes to the structure of the device. For example, introducing a thermocouple with a cross-section approximately one millimeter or smaller into a cavity with a slightly larger diameter (as in FR3110099A1), over a distance that can reach or exceed a meter, is complicated.

Furthermore, if the thermocouple is sandwiched between two metal sheets which are then brazed together with the rest of the structure, there is a risk to the integrity of the probe. In fact, the sheath thicknesses encapsulating a thermocouple's hot solder are insufficient—typically around 10% of the diameter value—to avoid being completely dissolved by the liquid solder. This design therefore makes it impossible to guarantee accurate temperature measurement, or even measurement acquisition, if the sensor's heat-sensitive elements are also dissolved.

The invention aims to remedy the aforementioned drawbacks by proposing a method of manufacturing a heat exchanger instrumented to measure temperature, without modifying the architecture of the structure and without altering the characteristics of the temperature probe.

SUMMARY OF THE INVENTION

To this end, the invention relates to a method for manufacturing a heat exchanger, comprising a step of assembling, by brazing, a temperature probe to an element of the exchanger, said temperature probe comprising a sheath. The method further comprises a step, prior to the assembly step, wherein a thin protective coating is deposited on said sheath, said coating being resistant to dissolution during brazing by an alloy used as filler metal.

The manufacturing method according to the invention comprises a step which consists in protecting the sheath of the temperature probe (which can be a thermocouple), by depositing a protective coating before the brazing step.

The surface treatment with a thin protective layer limits interactions between the liquid solder and the probe sheath. The interactions may be, for example, a chemical reaction between the materials forming the sheath and the filler alloy.

In this way, the method according to the invention enables a temperature probe to be permanently assembled in a heat exchanger (e.g. made of aluminum) without modifying its architecture or altering the operation of the sensor.

For example, unlike the known methods described above, it is not necessary to make a groove to position the probe.

In this way, it is possible to preserve the integrity of the temperature probe during the brazing of the structure without causing a significant thickening of the separator sheet for implanting the temperature probe.

The proposed solution is therefore inexpensive and easy to implement, minimally intrusive, while guaranteeing good, long-term in-situ measurement quality.

According to embodiment examples, the heat exchanger is a brazed plate exchanger, wherein the temperature probe is joined by brazing to a fluid separator plate.

Advantageously, the coating can be formed by a PVD, CVD, or electroplating method.

The advantage of these thin-film manufacturing methods is that they are easy to implement on an industrial scale.

Advantageously, the thin coating may have a thickness between 5 μm and 50 μm. This thickness is sufficient to protect the sheath without preventing brazing.

Advantageously, the thin coating may comprise a metallic material that is non-reactive with the alloy used as brazing filler metal. This reduces or prevents reactivity with the filler alloy and ensures sheath protection.

In one embodiment, the coating may comprise a super-position of two layers of different materials.

The coating material can be, for example, titanium and/or silver. It can be deposited as a single layer or in two distinct layers, comprising for example a first coating of silver, for example from 3 to 15 μm and a second coating of titanium, for example with a thickness of between 10 and 35 μm.

According to a second aspect, the invention relates to a heat exchanger obtained by the method according to the above description.

The invention also relates to a temperature probe suitable for use in a heat exchanger manufacturing method as described above, said probe comprising a thin coating formed on the sheath to prevent its dissolution by an alloy used as a brazing filler metal.

BRIEF DESCRIPTION OF THE DRAWINGS

Further features and advantages of the invention will become apparent from the following detailed description, which can be understood with reference to the accompanying drawings, wherein:

FIG. 1 shows an example of a heat exchanger matrix being stacked.

FIG. 2 shows a section of the matrix containing a temperature probe.

FIG. 3 is a schematic vertical cross-section showing how the probe is brazed in place.

DETAILED DESCRIPTION OF THE INVENTION

In the description below, we describe examples wherein the resulting heat exchanger is a brazed plate-wave exchanger. However, the invention is also applicable to other types of heat exchanger that can be instrumented by the addition of one or more brazed-on temperature probes.

FIG. 1 shows a perspective exploded view of a matrix 2 of a brazed plate heat exchanger 1. The matrix 2 is shown being stacked. It is made of aluminum, for example, but can also, according to variants, be made of other metals, such as steel.

In a known way, the matrix 2 comprises a stack of components, including in particular waves 3, fluid separation plates (also called sheets) 4 and aluminum bars 5 surrounding the waves 3.

The heat exchanger 1 can be instrumented by adding one or more temperature probes to monitor temperature variations inside.

FIG. 2 shows an example of the invention wherein a temperature probe 6 is attached to a separator plate 4. In the example shown, the probe is positioned between two corrugated plates 3. In addition, the bar is cut into two parts 5' to allow the probe to pass through.

The probe 6 is used to measure the temperature of separator plate 4.

In other, not-shown examples, the bars do not need to be cut.

According to the examples, one or more probes (e.g. thermocouples) with a diameter of between 0.25 and 1 mm can be used. The probes can be placed directly on the surface of the separator plate without disturbing the flow of fluids, and assembled on the surface when the equipment is brazed.

FIG. 3 shows an example of a temperature probe 6 before (i) and after (ii) its assembly by brazing with a separator plate 4. The separator plate 4 comprises a core 40 onto which a brazing filler 41 (comprising a brazing filler alloy, e.g. aluminum-based) is deposited.

The temperature probe 6 is placed on the plate 4 prior to brazing. This temperature probe as such is known, and comprises an insulating material 60 surrounding a thermo-sensitive element 61, and the whole assembly is covered by a protective sheath 62. It also comprises a connector 63 as shown in FIG. 2.

To assemble the probe 6 on the plate 4, the latter is placed in a brazing furnace after removal of the connector 63, which will only be put into place after brazing.

Optionally, before brazing, the cold-junction end of the sheath can be sealed by laser welding. Alternatively, if the probe is too long, the part remaining outside the plate can be rolled up and mechanically attached to the equipment before brazing.

The furnace is heated to brazing temperature, which melts the brazing alloy 41'. This then partially or fully surrounds the probe and secures it to plate 4.

It is well known to the person skilled in the art that temperature probes (thermocouples) are commonly made of a material that is difficult to join by brazing if the brazing agent used is a low-melting aluminum alloy, for example that used in the manufacture of aluminum heat exchangers.

Aluminum is highly reactive with iron, nickel and chromium, causing an exothermic reaction when it comes into contact with them in its liquid state. This reactivity is sufficient to alter the sheath of the thermocouple, generally made of Inconel (a Ni—Cr—Fe-based alloy), and affect the measurement if the quantities of liquid supplied when the solder melts are sufficient to dissolve the entire probe.

To protect the sheath during brazing, the method according to the invention includes a probe surface treatment step prior to the brazing step.

The surface treatment involves depositing a thin coating on the sheath to prevent it being dissolved by an alloy used as a brazing filler metal. The thin coating limits interaction between the liquid solder and the probe sheath, without preventing the probe from being attached to the plate.

The coating can be formed by one of the following methods: PVD, CVD or electroplating, or by any other means enabling the thin deposition of a metal layer capable of limiting the dissolution of the sheath while maintaining the ability to be assembled using a filler alloy.

The thin coating may comprise a metallic material that is non-reactive with the alloy used as brazing filler metal.

Advantageously, the thin coating 64 may have a thickness between 5 μm and 50 μm. The coating material can be, for example, titanium and/or silver. It can be deposited as a single layer or in two distinct layers, comprising for example a first coating of silver, for example from 3 to 15 μm and a second coating of titanium, for example with a thickness of between 10 and 35 μm.

The invention claimed is:
1. A method for manufacturing a heat exchanger, comprising:
  assembling, by brazing, a temperature probe to an element of the exchanger, said temperature probe comprising a sheath; and
  prior to the assembly step, depositing a thin coating on said sheath, said coating comprises a metallic material that is resistant to dissolution by an aluminum-based brazing filler alloy at a brazing temperature.

2. The method according to claim 1 wherein the thin coating comprises a metallic material non-reactive with the alloy used as brazing filler metal.

3. The method according to claim 2 wherein the thin coating comprises titanium and/or silver.

4. The method according to claim 1, wherein the thin coating comprises a superposition of two layers of different materials.

5. The method according to claim 4, wherein the coating comprises a silver layer and a titanium layer.

6. The method for manufacturing a heat exchanger according to claim 1, wherein the heat exchanger is a brazed plate exchanger and wherein the temperature probe is brazed to a fluid separator plate.

7. The method for manufacturing a heat exchanger according to claim 1, wherein the thin coating is formed by a PVD, CVD, or electroplating method.

8. The method according to claim 1 wherein the thin coating has a thickness of between 5 μm and 50 μm.

9. A heat exchanger obtained by the method according to claim 1.

10. A temperature probe suitable for use in a method for manufacturing of the heat exchanger according to claim 1, said probe being characterized in that it comprises a thin coating formed on the sheath to prevent its dissolution by an alloy used as a brazing filler metal.

* * * * *